US007847822B2

(12) United States Patent
Berestov et al.

(10) Patent No.: US 7,847,822 B2
(45) Date of Patent: Dec. 7, 2010

(54) SEQUENTIAL REGRESSION FOR CALIBRATION FROM RESIDUES

(75) Inventors: Alexander Berestov, San Jose, CA (US); Kenichi Nishio, Yokohama (JP); Ted J. Cooper, Sunnyvale, CA (US); Masaya Kinoshita, Yokohama (JP); Ting Zhang, Tokyo (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 427 days.

(21) Appl. No.: 11/818,801

(22) Filed: Jun. 14, 2007

(65) Prior Publication Data

US 2008/0309767 A1 Dec. 18, 2008

(51) Int. Cl.
*H04N 17/00* (2006.01)
*H04N 17/02* (2006.01)
(52) U.S. Cl. ..................................... 348/187; 348/223.1
(58) Field of Classification Search ................. 348/187, 348/223.1, 241–255, 175
See application file for complete search history.

(56) References Cited

U.S. PATENT DOCUMENTS

| 5,668,596 | A | 9/1997 | Vogel | 348/222 |
|---|---|---|---|---|
| 6,130,756 | A | 10/2000 | Grady et al. | 358/1.1 |
| 6,184,925 | B1 * | 2/2001 | Abe et al. | 348/223.1 |
| 6,734,896 | B2 * | 5/2004 | Nobori et al. | 348/148 |
| 7,012,634 | B2 * | 3/2006 | Vogel et al. | 348/187 |
| 7,235,773 | B1 * | 6/2007 | Newman | 348/241 |
| 2003/0007077 | A1 * | 1/2003 | Maggi | 348/223.1 |
| 2003/0081214 | A1 | 5/2003 | Mestha et al. | 356/402 |
| 2003/0233589 | A1 * | 12/2003 | Alvarez | 713/300 |
| 2005/0275911 | A1 | 12/2005 | Yamada et al. | 358/518 |
| 2006/0142965 | A1 * | 6/2006 | Minor | 702/85 |
| 2007/0177032 | A1 * | 8/2007 | Wong | 348/223.1 |
| 2008/0170228 | A1 * | 7/2008 | Jiang | 348/231.99 |

FOREIGN PATENT DOCUMENTS

EP 1367815 A2 3/2003

\* cited by examiner

*Primary Examiner*—Gevell Selby
(74) *Attorney, Agent, or Firm*—Haverstock & Owens LLP

(57) ABSTRACT

A system for and method of calibrating an imaging device efficiently is described herein. The imaging device acquires an image of an object that is more than one color. The information acquired is then transferred to a computing device. The information is then used to generate a set of data which represents information which was not acquired in the image. The set of data is generated based on statistical prediction using a training data set. Using acquired image information and the set of data, an imaging device is able to be calibrated. Since the process of calibration utilizing this method only requires one image to be acquired and a reduced set of image information to be sent to the computing device, the process is more efficient than previous implementations.

37 Claims, 6 Drawing Sheets

SEQUENTIAL REGRESSION FOR CALIBRATION FROM RESIDUES

FIELD OF THE INVENTION

The present invention relates to the field of digital devices. More specifically, the present invention relates to calibrating digital devices.

BACKGROUND OF THE INVENTION

A digital still camera (DSC) or video camera (camcorder) has a sensor that is covered by a color filter array (CFA) to create pixel locations. A DSC typically uses red, green and blue (RGB) filters to create their image. Most current camcorders typically use cyan, magenta, yellow and green (CMYG) filters for the same purpose.

A conventional sensor is a charge-coupled device (CCD) or complimentary metal oxide semiconductor (CMOS). An imaging system focuses a scene onto the sensor and electrical signals are generated that correspond to the scene colors that get passed through the colored filters. Electronic circuits amplify and condition these electrical signals for each pixel location and then digitize them. Algorithms in the camera then process these digital signals and perform a number of operations needed to convert the raw digital signals into a pleasing color image that can be shown on a color display or sent to a color printer.

Each color camera has a unique sensor, CFA, and analog electronics system. The sensor and CFA have part-to-part variations. Accordingly, the electronic system needs to be calibrated for each camera. The goal is to make a "real world" scene captured with different cameras look the same when rendered on a display device. In order to calibrate an individual camera, the properties of the individual camera's primary color channels (CMYG for a camcorder; RGB for a DSC) need to be measured so that the individual camera's response to known colors can be quantized.

In the past, to calibrate a DSC, several pictures were taken with the DSC of objects with different colors. The more colors acquired, the better the calibration would be. The data from these pictures would then be transferred to a computer for analysis, and then parameters are adjusted within the DSC based on the analysis so that the DSC produces the best and most realistic colors. As described above, this was necessary because there are part to part differences in each camera such as there are slight variations in each sensor.

The main drawback of the previous systems which took multiple pictures is that they were slow. It takes time to take a number of pictures of different objects with different colors. It also takes time to transfer the data to a computer for analysis and calibration because typically the connection is slow.

SUMMARY OF THE INVENTION

A system for and method of calibrating an imaging device efficiently is described herein. The imaging device acquires an image of an object that is more than one color. The information acquired is then transferred to a computing device. The information is then used to generate a set of data which represents information which was not acquired in the image. The set of data is generated based on statistical prediction using a training data set. Using acquired image information and the set of data, an imaging device is able to be calibrated. Since the process of calibration utilizing this method only requires one image to be acquired and a reduced set of image information to be sent to the computing device, the process is more efficient than previous implementations.

In one aspect, a computing device for calibrating an imaging device comprises a processor and an application for utilizing the processor to generate calibration settings for the imaging device from an image and a training data set. The device further comprises a communication unit for communicating with the imaging device. The imaging device is selected from the group consisting of a digital camera and a digital camcorder. The computing device is selected from the group consisting of a personal computer, a server, a workstation, a PDA and a laptop. Preferably, the image is more than one color. The computing device calibrates the imaging device. The computing device calibrates a sensor within the imaging device. The calibration settings are computed using recursive linear regression. Recursive linear regression comprises acquiring the training data set comprising a first set of parameters and a second set of parameters using a plurality of imaging devices, correlating a parameter from the first set of parameters with the second set of parameters to determine a highest correlation parameter, using linear regression to predict a predicted parameter from the first set of parameters using the highest correlation parameter, determining a difference between the predicted parameter and the parameter from the first set of parameters, correlating the difference with the second set of parameters to determine the highest correlation parameter if the difference between the predicted parameter and the parameter from the first set of parameters is not below a threshold, using linear regression to predict the difference using the highest correlation parameter if the difference between the predicted parameter and the parameter from the first set of parameters is not below the threshold, repeating the steps until the difference is below the threshold and repeating the steps for all of the parameters in the first set of parameters. In some embodiments, the processor and the application are contained within the imaging device.

In another aspect, a calibration system comprises an imaging device for acquiring an image and a computing device coupled to the imaging device for storing a training data set and for computing calibration settings from the image and the training data set. The imaging device is selected from the group consisting of a digital camera and a digital camcorder. The computing device is selected from the group consisting of a personal computer, a server, a workstation, a PDA and a laptop. Preferably, the image is more than one color. The computing device calibrates the imaging device. The computing device calibrates a sensor within the imaging device. The calibration settings are computed using recursive linear regression. Recursive linear regression comprises acquiring the training data set comprising a first set of parameters and a second set of parameters using a plurality of imaging devices, correlating a parameter from the first set of parameters with the second set of parameters to determine a highest correlation parameter, using linear regression to predict a predicted parameter from the first set of parameters using the highest correlation parameter, determining a difference between the predicted parameter and the parameter from the first set of parameters, correlating the difference with the second set of parameters to determine the highest correlation parameter if the difference between the predicted parameter and the parameter from the first set of parameters is not below a threshold, using linear regression to predict the difference using the highest correlation parameter if the difference between the predicted parameter and the parameter from the first set of parameters is not below the threshold, repeating the steps until the difference is below the threshold and repeating the steps for all of the parameters in the first set of parameters.

In another aspect, a calibration system comprises a set of imaging devices for acquiring a set of images, one or more additional imaging devices each for acquiring an image and a computing device coupled to the set of imaging devices for receiving the set of images, computing a training data set from the set of images and storing the training data set, further wherein the computing device is coupled to each of the one or more additional imaging devices for receiving the image for computing calibration settings from the image and the training data set. The first imaging device and the one or more additional imaging devices are selected from the group consisting of a digital camera and a digital camcorder. The computing device is selected from the group consisting of a personal computer, a server, a workstation, a PDA and a laptop. The computing device calibrates the imaging device. The computing device calibrates a sensor within the imaging device. The calibration settings are computed using recursive linear regression. Recursive linear regression comprises acquiring the training data set comprising a first set of parameters and a second set of parameters using a plurality of imaging devices, correlating a parameter from the first set of parameters with the second set of parameters to determine a highest correlation parameter, using linear regression to predict a predicted parameter from the first set of parameters using the highest correlation parameter, determining a difference between the predicted parameter and the parameter from the first set of parameters, correlating the difference with the second set of parameters to determine the highest correlation parameter if the difference between the predicted parameter and the parameter from the first set of parameters is not below a threshold, using linear regression to predict the difference using the highest correlation parameter if the difference between the predicted parameter and the parameter from the first set of parameters is not below the threshold, repeating the steps until the difference is below the threshold and repeating the steps for all of the parameters in the first set of parameters.

In another aspect, a method of generating a calibration system comprises acquiring a set of images with a set of imaging devices, transferring the set of images to a computing device and generating a training data set from the set of images on the computing device.

In yet another aspect, a method of calibrating an imaging device comprises acquiring an image with the imaging device, transferring the image to a computing device, generating a first set of regression coefficients for the image, generating a second set of regression coefficients using recursive linear regression and calibrating the imaging device using the first set of regression coefficients and the second set of regression coefficients. The imaging device is selected from the group consisting of a digital camera and a digital camcorder. The computing device is selected from the group consisting of a personal computer, a server, a workstation, a PDA and a laptop. Calibrating the imaging device includes calibrating a sensor within the imaging device. Recursive linear regression comprises acquiring the training data set comprising a first set of parameters and a second set of parameters using a plurality of imaging devices, correlating a parameter from the first set of parameters with the second set of parameters to determine a highest correlation parameter, using linear regression to predict a predicted parameter from the first set of parameters using the highest correlation parameter, determining a difference between the predicted parameter and the parameter from the first set of parameters, correlating the difference with the second set of parameters to determine the highest correlation parameter if the difference between the predicted parameter and the parameter from the first set of parameters is not below a threshold, using linear regression to predict the difference using the highest correlation parameter if the difference between the predicted parameter and the parameter from the first set of parameters is not below the threshold, repeating the steps until the difference is below the threshold and repeating the steps for all of the parameters in the first set of parameters. In some embodiments, the computing device is contained with the imaging device.

DETAILED DESCRIPTION OF THE PREFERRED EMBODIMENT

Figure 1:
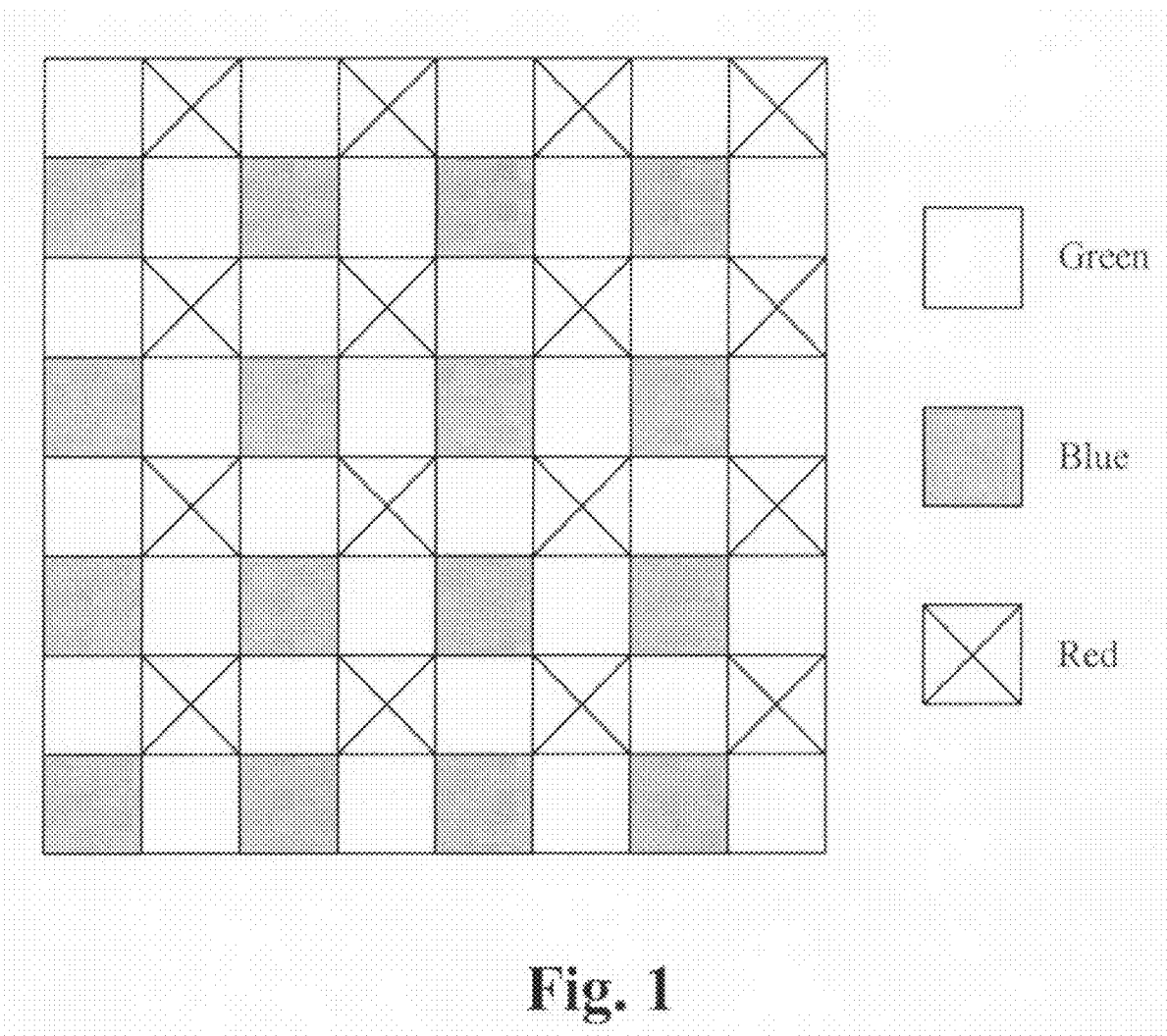
FIG. 1 illustrates a graphical representation of a color filter array.

A system for and method of calibrating digital devices such as a Digital Still Camera (DSC) and other imaging devices efficiently is described herein. DSCs and other imaging devices need to be calibrated because of the differences in color sensitivity of a Color Filter Array (CFA) used to capture photographs. Typically, calibration requires acquiring many images with different colors to properly calibrate the imaging device. However, with the system and method described herein, instead of taking many pictures with each imaging device, a training data set is developed by taking many pictures of different colors, but afterwards, the training data set is used to simulate the different colors when calibrating other imaging devices. Specifically, statistical methods are employed to predict the data for missing colors of an acquired image. The statistical methods include sequential/linear regression to predict the additional colors. For calibrating imaging devices after the training data set is developed, each imaging device needs to only acquire a single image. Furthermore, since only one image is taken, only one set of information is downloaded to a computer. Thus, multiple steps are saved which, in turn, saves time in calibrating each imaging device.

Sequential regression is used by iteratively evaluating how well the approximation to the training data set is progressing. This involves employing an error "residue" at each iteration to determine which of the patches will be optimally used for the next iteration. This results in fewer iterations being needed and produces a quicker camera calibration.

An example is used to describe linear regression, wherein linear regression is utilized in the method and system described herein to calibrate an imaging device. In this example, it is assumed that a monochrome signal has one sensor that measures different brightness levels from three patches. To predict the value the sensor would produce for colors not acquired, a multiple linear sum with weighting coefficients is able to be used from the three patches:

$$^{Pred}\text{Bright}=\alpha_0+\alpha_1 *^{acq}\text{Bright}_{patch1}+\alpha_2 *^{acq}\text{Bright}_{patch2}+\alpha_3 *^{acq}\text{Bright}_{patch3} \qquad (1)$$

The brightness sensor for the colors that were not acquired is a linear combination of the original three patches, where linear regression finds the alpha values which gives a best least squares fit to a training data set.

Rather than use all three patches in the summation, the training data set is used to find the correlation coefficients that relate the brightness of a patch not acquired to the brightness of the acquired patches. The correlation coefficients are able to indicate, for example, that a patch 1 not acquired is highly correlated to the acquired patch 1 and patch 3 and has little correlation to patch 2. In such a case, patch 2 would be dropped from the series because keeping it has very little significance and could increase estimation error. Thus, the rewritten equation is:

$$^{Pred}\text{Bright} = \alpha_0 + \alpha_1 *^{acq}\text{Bright}_{patch1} + \alpha_2 *^{acq}\text{Bright}_{patch3} \quad (2)$$

The regression coefficients are able to be directly determined. However, only a very limited number of measured patches directly affect the estimated value desired. By employing correlation analysis between the desired and measured data, the most significant correlation coefficients are able to be used to determine which measured data sets to use in the linear regression. One form of linear regression is recursive linear regression.

Recursive linear regression includes a number of steps, starting with:

$$Y = a_0 + a_1 X_{i1} + Y_1 \quad (3)$$

for a single patch and a single color channel, designated by Y, wherein the error after the approximation is given by $Y_1$.

Using Equations 1, 2 and 3, the objective is to find the best $\text{Bright}_{patchi}$ to use as the first term, $X_{i1}$ in Equation 3. In order to do that, the $^{Pred}\text{Bright}$ parameter from the training data set is taken and correlated with every $\text{Bright}_{patchi}$ (i=1, ..., N). The patch that has the highest correlation becomes $X_{i1}$. Then, $a_0$ and $a_1$ need to be determined. One method is as shown in Equation 4 below.

The terms $a_0$ and $a_1$ are solved for using the method of least squares in terms of means ($\overline{Y}$, $\overline{X}_{i1}$) and sample standard deviations ($\sigma_Y$, $\sigma_{X_{i1}}$):

$$Y = \overline{Y} + r_{YX_i} \frac{\sigma_Y}{\sigma_{X_{i1}}} (X_{i1} - \overline{X}_{i1}) + Y_1 \quad (4)$$

Then Equation 4 is used without $Y_1$ to predict $^{Pred}\text{Bright}$. By deducting $^{Pred}\text{Bright}$ from the measured $^{acq}\text{Bright}$ available in the training data set, the difference, $Y_1$, is found. If $Y_1$ is smaller than a threshold, the process stops. If not, $Y_1$ is represented with an equation similar to Equation 3: $Y_1 = b_0 + b_1 X_{i2} + Y_2$, and the steps are repeated by correlating $Y_1$ with every $\text{Bright}_{patchi}$ (i=1, ..., N) and so on. Ultimately, the results determine the final Equation 3 which will likely have less terms than Equation 1 which has N+1 terms.

As described above, each camera has a CFA. A standard CFA as shown in FIG. 1 includes many filters wherein each filter is selected from one of three colors: Red, Green and Blue. Other CFAs are able to be configured differently with different colors. During calibration, a picture is taken of an object with more than one color such as a color box. In alternative embodiments, a picture is taken of something other than a color box which also enables color calibration.

Figure 2:
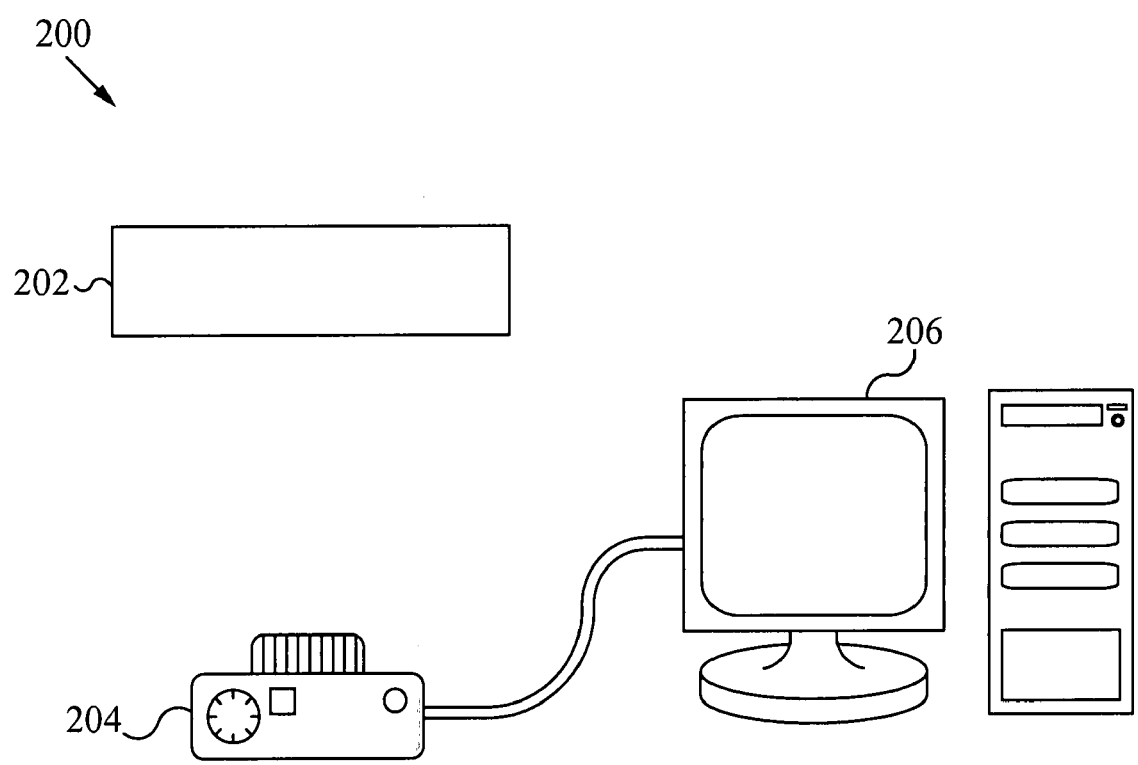
FIG. 2 illustrates a graphical representation of a calibration system.

FIG. 2 illustrates a graphical representation of a calibration system 200. The calibration system 200 includes an object 202 with more than one color such as a color box. An imaging device 204 such as a digital camera or camcorder acquires an image of the object where the image will be used to calibrate the imaging device 204. Components within the imaging device 204 such as a sensor are set to some initial values. After the image is acquired by the imaging device 204, the image information is transferred to a computing device 206 to determine what modifications are needed, if any, to calibrate the imaging device 204. The imaging device 204 is able to transfer the image information to the computing device 206 either wirelessly or wired, depending on the desired configuration. Then, from the acquired image information and a training data set, image information is generated for colors not acquired by the imaging device using recursive linear regression. Based on both sets of image information, the imaging device 204 is then able to be calibrated to properly acquire images in any lighting conditions. By only acquiring one image and transferring one set of imaging information, the process of calibrating an imaging device is improved greatly. Furthermore, since many imaging devices are calibrated; as a whole, a significant amount of time is saved.

Figure 3:
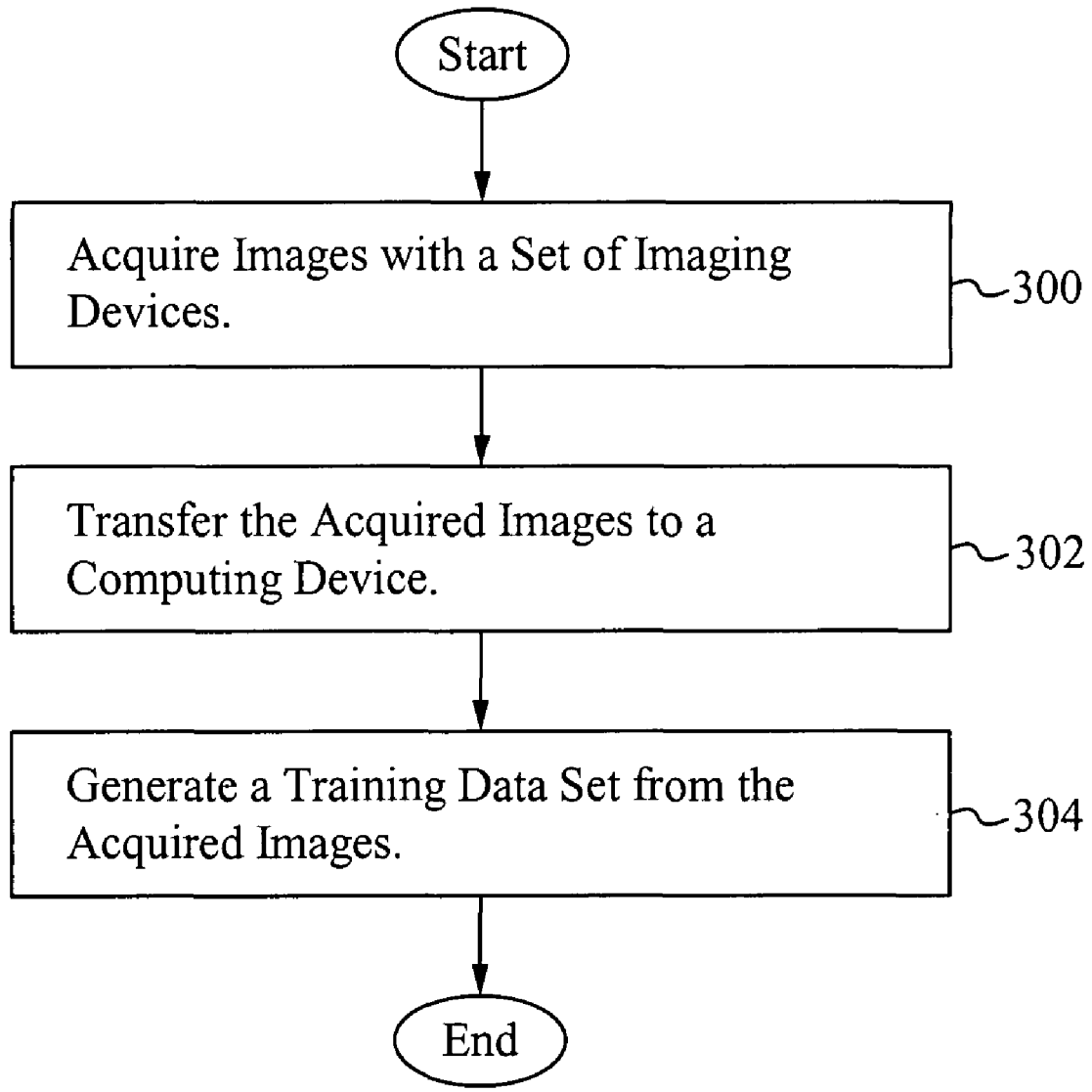
FIG. 3 illustrates a flowchart of a process of training a calibration system.

FIG. 3 illustrates a flowchart of a process of training a calibration system. In the step 300, many images are acquired of many different objects with varying colors such as a color box. The images are acquired with a set of imaging devices. In the step 302, the acquired images are transferred to a computing device. In the step 304, a training data set is generated from the acquired images. The training data set includes a first set of parameters and a second set of parameters.

Figure 4:
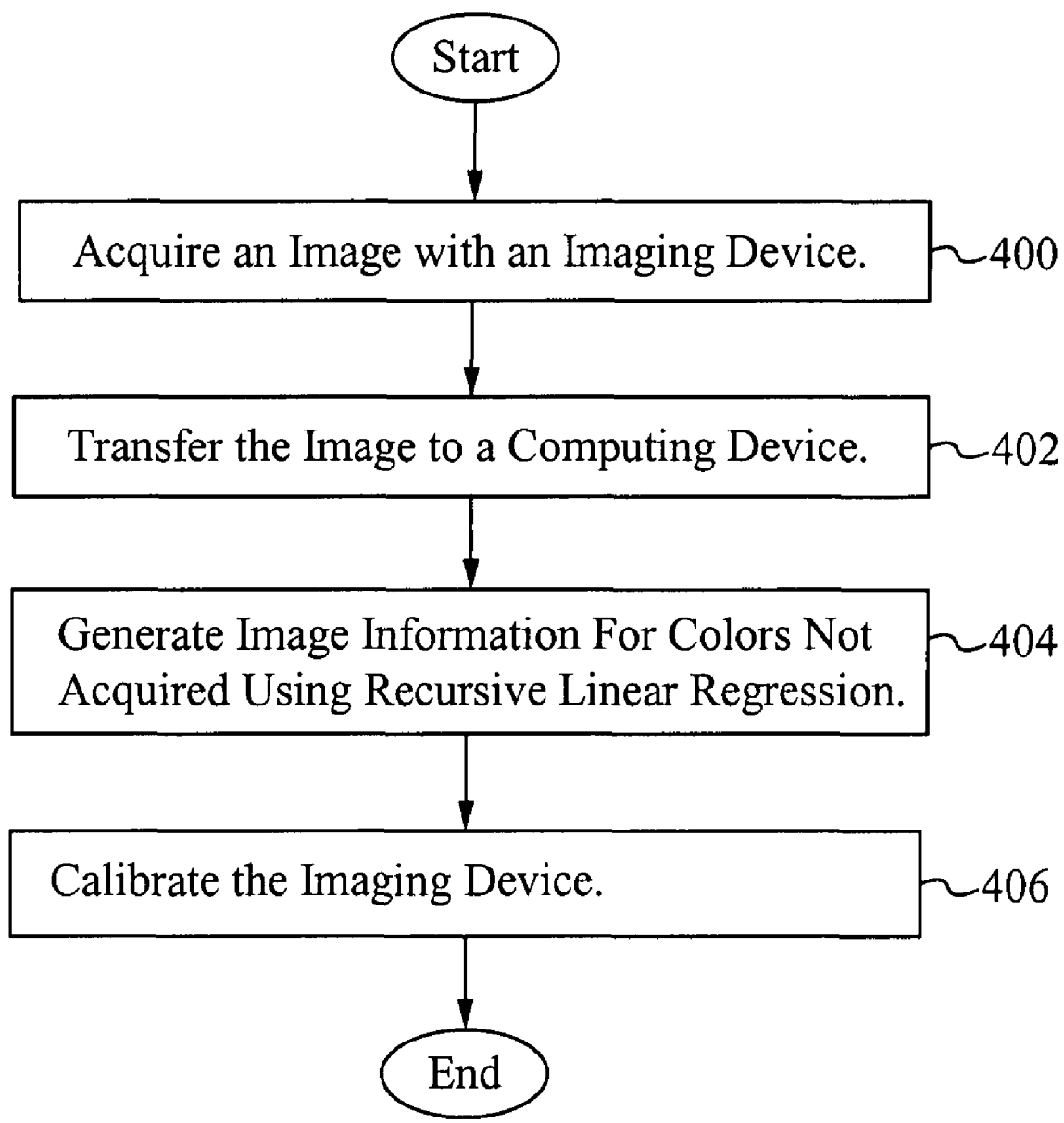
FIG. 4 illustrates a flowchart of a process of calibrating an imaging device.

FIG. 4 illustrates a flowchart of a process of calibrating an imaging device. In the step 400, an image is acquired with an imaging device of an object with more than one color such as a color box. In the step 402, the image is transferred to a computing device which contains a training data set. In an alternative embodiment, the training data set is transferred to the computing device after the image is transferred. From the acquired image and the training data set, image information for colors not acquired is generated using recursive linear regression, in the step 404. The imaging device is calibrated using the image information, in the step 406.

Figure 5:
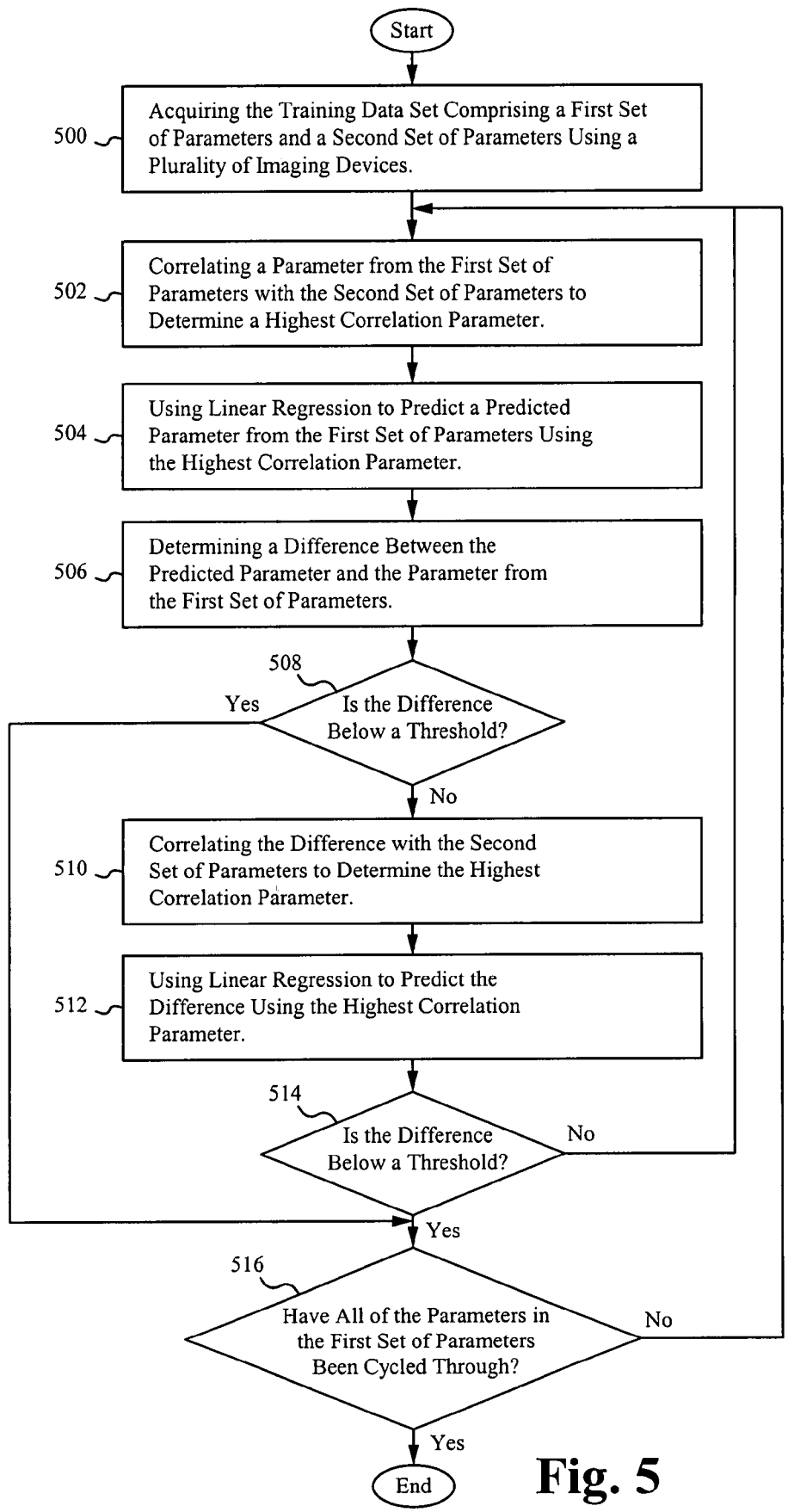
FIG. 5 illustrates a flowchart of a process of recursive linear regression.

FIG. 5 illustrates a flowchart of a process of recursive linear regression. In the step 500, a training data set is acquired using a plurality of imaging devices. The training data set includes a first set of parameters and a second set of parameters. In the step 502, a parameter from the first set of parameters is correlated with the second set of parameters to determine a highest correlation parameter. In the step 504, linear regression is used to predict a predicted parameter from the first set of parameters using the highest correlation parameter. In the step 506, a difference is determined between the predicted parameter and the parameter from the first set of parameters. In the step 508, it is determined if the difference is below a threshold. If the difference is not below a threshold, then the process continues to the step 510. If the difference is below the threshold, then the process is able to jump to the step 516. In the step 510, the difference is correlated with the second set of parameters to determine the highest correlation parameter. In the step 512, linear regression is used to predict the difference using the highest correlation parameter. In the step 514, it is determined if the difference is below a threshold. If the difference is not below a threshold, then the process resumes at the step 502. If the difference is below the threshold, then in the step 516, it is determined if all of the parameters in the first set of parameters have been cycled through. If all of the parameters have been used, then the process ends. Otherwise, the process resumes at the step 502 with the next parameter in the first set of parameters.

Figure 6:
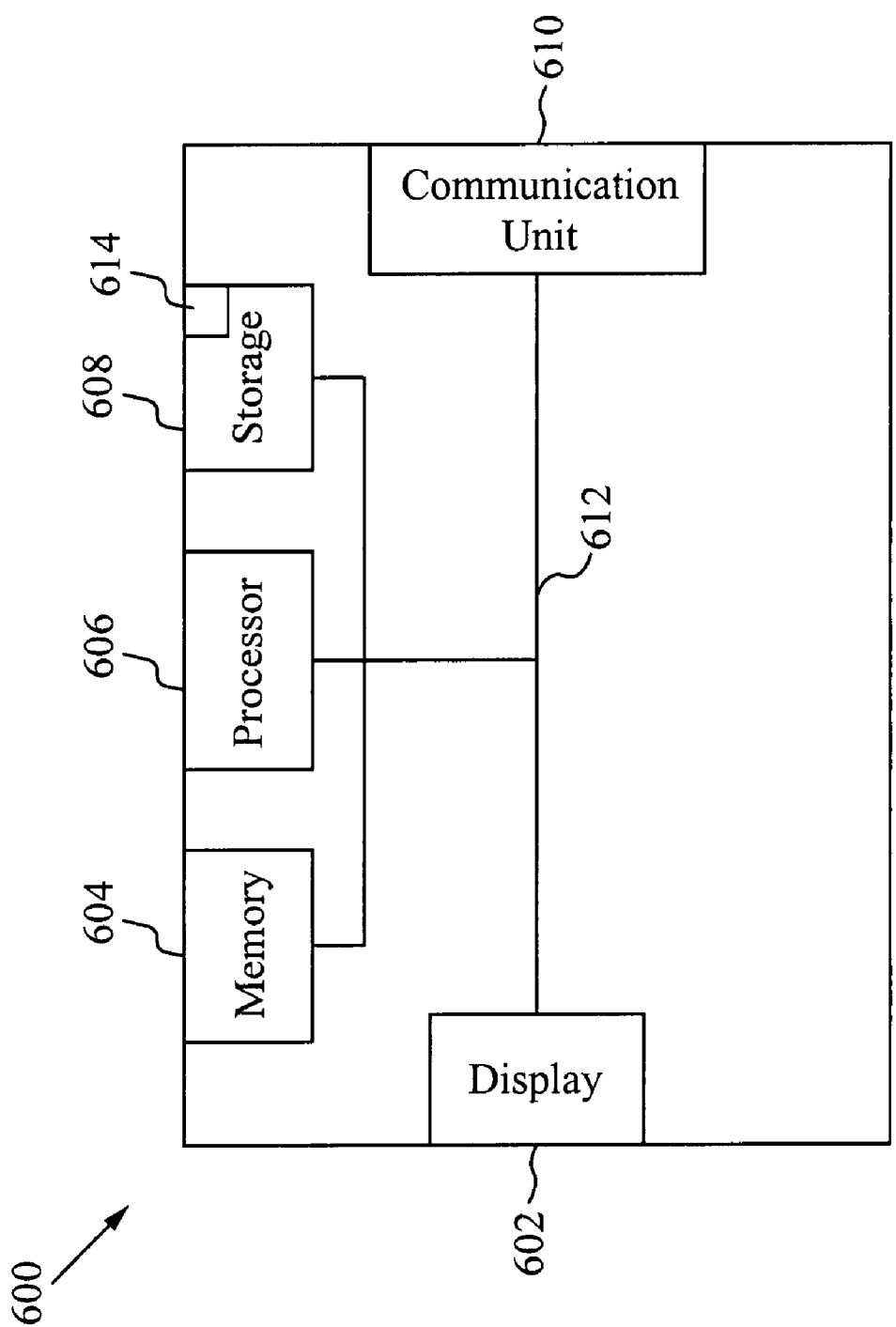
FIG. 6 illustrates a graphical representation of a computing device for calibrating an imaging device.

FIG. 6 illustrates a graphical representation of a computing device for calibrating an imaging device. A computing device 600 includes a number of elements: a display 602, a memory 604, a processor 606, a storage 608, a communication unit 610 and a bus 612 to couple the elements together. The communication unit 610 allows the imaging device to communicate with the computing device 600 such as to transfer acquired image data so the image data is processed by the processor 606 and temporarily stored on the memory 604 and more permanently on the storage 608. An application 614 stored within the storage 608 or at least with access to the processor 606 implements the method described herein to calibrate the imaging device. The display 602 displays information related to the application 614 in addition to other standard computing display information. The computing device 600 is able to be, but is not limited to, a personal computer, a server, a workstation, a PDA and a laptop.

To utilize the calibration system and method, a user acquires a set of images of objects of more than one color such as color boxes using several cameras, wherein the cameras are preferably from the same production line as the cameras to be calibrated. The acquired images are then sent to a computer to generate training data. Then, cameras to be calibrated each acquire a single image which is also sent to the computer. With the training data and the acquired image, data for colors not acquired is statistically predicted. Based on the acquired information and the predicted information, each camera is properly calibrated.

In operation, the camera calibration system and method is able to calibrate many more cameras in a shorter amount of time than previous calibration mechanisms. Aside from acquiring a set of images to generate a training set of data with a first set of cameras, the cameras to be calibrated only need to acquire one image. Thus, the time spent acquiring images is significantly reduced because only one image is acquired for the bulk of the cameras. Also, since the amount of data acquired is also significantly reduced because only one image is acquired for the bulk of the cameras. With much less data having to be transferred from the cameras to the computer, the amount of time spent on the transfer is also significantly reduced. The computer has additional computations to make to statistically predict the set of colors not acquired, but that amount of time is minimal compared to the time savings of acquire fewer images and transferring significantly less data.

Additional devices are able to be calibrated using the method described herein such as television screens, computer monitors, other displays and printers.

In some embodiments, a computing device which is used to calibrate an imaging device is included within the imaging device. For example, the imaging device contains at least one processor which in addition to performing image acquisition and manipulation operations, also performs image calibration computations as described above. The imaging device stores a calibration application which utilizes the processor to calibrate the imaging device. The imaging device receives the calibration application in any manner, such as via a wired connection or wirelessly. Data that the computing device would receive as described above is also able to be received within the imaging device in any manner.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A computing device for calibrating an imaging device comprising:
   a. a processor; and
   b. an application for utilizing the processor to generate calibration settings for the imaging device from an image and a training data set, wherein the training data set is determined before the calibration, wherein the calibration settings are computed using recursive linear regression.

2. The device as claimed in claim 1 further comprising a communication unit for communicating with the imaging device.

3. The device as claimed in claim 1 wherein the imaging device is selected from the group consisting of a digital camera and a digital camcorder.

4. The device as claimed in claim 1 wherein the computing device is selected from the group consisting of a personal computer, a server, a workstation, a PDA and a laptop.

5. The device as claimed in claim 1 wherein the image is more than one color.

6. The system as claimed in claim 1 wherein the computing device calibrates the imaging device.

7. The device as claimed in claim 1 wherein the computing device calibrates a sensor within the imaging device.

8. The device as claimed in claim 1 wherein recursive linear regression comprises:
   a. acquiring the training data set comprising a first set of parameters and a second set of parameters using a plurality of imaging devices;
   b. correlating a parameter from the first set of parameters with the second set of parameters to determine a parameter with a highest correlation;
   c. using linear regression to predict a predicted parameter from the first set of parameters using the parameter with the highest correlation;
   d. determining a difference between the predicted parameter and the parameter from the first set of parameters;
   e. correlating the difference with the second set of parameters to determine the parameter with the highest correlation, if the difference between the predicted parameter and the parameter from the first set of parameters is not below a threshold;
   f. using linear regression to predict the difference using the parameter with the highest correlation if the difference between the predicted parameter and the parameter from the first set of parameters is not below the threshold;
   g. repeating b-f until the difference is below the threshold; and
   h. repeating b-g for all of the parameters in the first set of parameters.

9. A computing device for calibrating an imaging device comprising:
   a. a processor; and
   b. an application for utilizing the processor to generate calibration settings for the imaging device from an image and a training data set, wherein the training data set is determined before the calibration, wherein the processor and the application are contained within the imaging device.

10. The device as claimed in claim 9 further comprising a communication unit for communicating with the imaging device.

11. The device as claimed in claim 9 wherein the imaging device is selected from the group consisting of a digital camera and a digital camcorder.

12. The device as claimed in claim 9 wherein the computing device is selected from the group consisting of a personal computer, a server, a workstation, a PDA and a laptop.

13. The device as claimed in claim 9 wherein the image is more than one color.

14. The system as claimed in claim 9 wherein the computing device calibrates the imaging device.

15. The device as claimed in claim 9 wherein the computing device calibrates a sensor within the imaging device.

16. A calibration system comprising:
   a. an imaging device for acquiring an image; and
   b. a computing device coupled to the imaging device for storing a training data set and for computing calibration settings from the image and the training data set, wherein the training data set is determined before the calibration, wherein the calibration settings are computed using recursive linear regression.

17. The system as claimed in claim 16 wherein the imaging device is selected from the group consisting of a digital camera and a digital camcorder.

18. The system as claimed in claim 16 wherein the computing device is selected from the group consisting of a personal computer, a server, a workstation, a PDA and a laptop.

19. The system as claimed in claim 16 wherein the image is more than one color.

20. The system as claimed in claim 16 wherein the computing device calibrates the imaging device.

21. The system as claimed in claim 16 wherein the computing device calibrates a sensor within the imaging device.

22. The system as claimed in claim 16 wherein recursive linear regression comprises:
   a. acquiring the training data set comprising a first set of parameters and a second set of parameters using a plurality of imaging devices;
   b. correlating a parameter from the first set of parameters with the second set of parameters to determine a parameter with a highest correlation;
   c. using linear regression to predict a predicted parameter from the first set of parameters using the parameter with the highest correlation;
   d. determining a difference between the predicted parameter and the parameter from the first set of parameters;
   e. correlating the difference with the second set of parameters to determine the parameter with the highest correlation if the difference between the predicted parameter and the parameter from the first set of parameters is not below a threshold;
   f. using linear regression to predict the difference using the parameter with the highest correlation if the difference between the predicted parameter and the parameter from the first set of parameters is not below the threshold;
   g. repeating b-f until the difference is below the threshold; and
   h. repeating b-g for all of the parameters in the first set of parameters.

23. A calibration system comprising:
   a. a set of imaging devices for acquiring a set of images;
   b. one or more additional imaging devices each for acquiring an image; and
   c. a computing device coupled to the set of imaging devices for receiving the set of images, computing a training data set from the set of images and storing the training data set, wherein the computing device is coupled to each of the one or more additional imaging devices for receiving the image for computing calibration settings from the image and the training data set; wherein the training data set is computed before the calibration settings.

24. The system as claimed in claim 23 wherein the first imaging device and the one or more additional imaging devices are selected from the group consisting of a digital camera and a digital camcorder.

25. The system as claimed in claim 23 wherein the computing device is selected from the group consisting of a personal computer, a server, a workstation, a PDA and a laptop.

26. The system as claimed in claim 23 wherein the computing device calibrates the imaging device.

27. The system as claimed in claim 23 wherein the computing device calibrates a sensor within the imaging device.

28. The system as claimed in claim 23 wherein the calibration settings are computed using recursive linear regression.

29. The system as claimed in claim 28 wherein recursive linear regression comprises:
   a. acquiring the training data set comprising a first set of parameters and a second set of parameters using a plurality of imaging devices;
   b. correlating a parameter from the first set of parameters with the second set of parameters to determine a parameter with a highest correlation;
   c. using linear regression to predict a predicted parameter from the first set of parameters using the parameter with the highest correlation;
   d. determining a difference between the predicted parameter and the parameter from the first set of parameters;
   e. correlating the difference with the second set of parameters to determine the parameter with the highest correlation if the difference between the predicted parameter and the parameter from the first set of parameters is not below a threshold;
   f. using linear regression to predict the difference using the parameter with the highest correlation if the difference between the predicted parameter and the parameter from the first set of parameters is not below the threshold;
   g. repeating b-f until the difference is below the threshold; and
   h. repeating b-g for all of the parameters in the first set of parameters.

30. A method of generating a calibration system comprising:
   a. acquiring a set of images with a set of imaging devices;
   b. transferring the set of images to a computing device; and
   c. generating a training data set from the set of images on the computing device,
   wherein the training data set is for calibrating a target set of imaging devices; wherein the training data set is generated before the calibration.

31. A method of calibrating an imaging device comprising:
   a. acquiring an image with the imaging device;
   b. transferring the image to a computing device which contains a training data set;
   c. generating image information using recursive linear regression; and
   d. calibrating the imaging device using the image information;
   wherein the training data set is determined before the calibration.

32. The method as claimed in claim 31 wherein the imaging device is selected from the group consisting of a digital camera and a digital camcorder.

33. The method as claimed in claim 31 wherein the computing device is selected from the group consisting of a personal computer, a server, a workstation, a PDA and a laptop.

34. The method as claimed in claim 31 wherein calibrating the imaging device includes calibrating a sensor within the imaging device.

35. The method as claimed in claim 31 wherein recursive linear regression comprises:
  a. acquiring the training data set comprising a first set of parameters and a second set of parameters using a plurality of imaging devices;
  b. correlating a parameter from the first set of parameters with the second set of parameters to determine a parameter with a highest correlation;
  c. using linear regression to predict a predicted parameter from the first set of parameters using the parameter with the highest correlation;
  d. determining a difference between the predicted parameter and the parameter from the first set of parameters;
  e. correlating the difference with the second set of parameters to determine the parameter with the highest correlation if the difference between the predicted parameter and the parameter from the first set of parameters is not below a threshold;
  f. using linear regression to predict the difference using the parameter with the highest correlation if the difference between the predicted parameter and the parameter from the first set of parameters is not below the threshold;
  g. repeating b-f until the difference is below the threshold; and
  h. repeating b-g for all of the parameters in the first set of parameters.

36. The method as claimed in claim 31 wherein the computing device is contained with the imaging device.

37. A computing device for calibrating a first imaging device comprising:
  a. a processor; and
  b. an application for utilizing the processor to generate calibration settings for the first imaging device from a first image and a training data set, wherein the training data set is based on a second image acquired by a second imaging device.

* * * * *